(12) United States Patent
Jackson

(10) Patent No.: US 9,225,663 B2
(45) Date of Patent: *Dec. 29, 2015

(54) SYSTEM AND METHOD PROVIDING A VIRTUAL PRIVATE CLUSTER

(71) Applicant: Adaptive Computing Enterprises, Inc., Provo, UT (US)

(72) Inventor: David Brian Jackson, Spanish Fork, UT (US)

(73) Assignee: Adaptive Computing Enterprises, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/703,990

(22) Filed: May 5, 2015

(65) Prior Publication Data

US 2015/0236972 A1 Aug. 20, 2015

Related U.S. Application Data

(63) Continuation-in-part of application No. 14/590,102, filed on Jan. 6, 2015, which is a continuation of application No. 11/276,852, filed on Mar. 16, 2006, now Pat. No. 8,930,536.

(60) Provisional application No. 60/662,240, filed on Mar. 16, 2005.

(51) Int. Cl.
*G06F 15/173* (2006.01)
*G06F 7/04* (2006.01)
*G06F 7/00* (2006.01)
*H04L 12/911* (2013.01)
*H04L 29/08* (2006.01)
(Continued)

(52) U.S. Cl.
CPC ............... *H04L 47/70* (2013.01); *H04L 67/10* (2013.01); *G06F 9/5027* (2013.01); *G06Q 10/06* (2013.01)

(58) Field of Classification Search
CPC . G06F 9/5027; G06Q 10/06; H04L 29/08144
USPC ........................................................ 709/226
See application file for complete search history.

(56) References Cited

U.S. PATENT DOCUMENTS 4,412,288 A 10/1983 Herman
4,525,780 A 6/1985 Bratt et al.
(Continued)

FOREIGN PATENT DOCUMENTS

WO WO 01/14987 3/2001
WO WO 2005/017783 2/2005

OTHER PUBLICATIONS

David Jackson et al., "Grid Computing: Beyond Enablement", Cluster Resources, Inc. Jan. 21, 2005.

*Primary Examiner* — Arvin Eskandarnia
*Assistant Examiner* — Margishi Desai

(57) ABSTRACT

The present invention provides a system, method and computer-readable media for generating virtual private clusters out of a group of compute resources. Typically, the group of compute resources involves a group of clusters independently administered. The method provides for aggregating the group of compute resources, partitioning the aggregated group of compute resources and presenting to each user in an organization a partition representation the organization's virtual private cluster. The users transparently view their cluster and have control over its operation. The partitions may be static or dynamic.

20 Claims, 4 Drawing Sheets

(51) Int. Cl.
    *G06F 9/50*         (2006.01)
    *G06Q 10/06*        (2012.01)

(56) References Cited

U.S. PATENT DOCUMENTS

| | | | |
|---|---|---|---|
| 5,257,374 A | 10/1993 | Hammer et al. |
| 5,761,484 A | 6/1998 | Agarwal et al. |
| 5,781,624 A | 7/1998 | Mitra et al. |
| 5,799,174 A | 8/1998 | Muntz et al. |
| 5,911,143 A | 6/1999 | Deinhart et al. |
| 5,978,356 A | 11/1999 | Elwalid et al. |
| 6,085,238 A | 7/2000 | Yuasa et al. |
| 6,182,142 B1 | 1/2001 | Win et al. |
| 6,185,575 B1 | 2/2001 | Orcutt |
| 6,259,675 B1 | 7/2001 | Honda |
| 6,353,844 B1 | 3/2002 | Bitar et al. |
| 6,366,945 B1 | 4/2002 | Fong et al. |
| 6,392,989 B1 | 5/2002 | Jardetzky et al. |
| 6,393,581 B1 | 5/2002 | Friedman et al. |
| 6,404,768 B1 | 6/2002 | Basak et al. |
| 6,438,134 B1 | 8/2002 | Chow et al. |
| 6,453,383 B1 | 9/2002 | Stoddard et al. |
| 6,463,454 B1 | 10/2002 | Lumelsky et al. |
| 6,496,866 B2 | 12/2002 | Attanasio et al. |
| 6,502,135 B1 | 12/2002 | Munger et al. |
| 6,529,499 B1 | 3/2003 | Doshi et al. |
| 6,564,261 B1 | 5/2003 | Gudjonsson et al. |
| 6,587,469 B1 | 7/2003 | Bragg |
| 6,587,938 B1 | 7/2003 | Eilert et al. |
| 6,628,649 B1 | 9/2003 | Raj et al. |
| 6,629,081 B1 | 9/2003 | Cornelius et al. |
| 6,661,787 B1 | 12/2003 | O'Connell et al. |
| 6,771,661 B1 | 8/2004 | Chawla et al. |
| 6,816,905 B1 | 11/2004 | Sheets et al. |
| 6,934,702 B2 | 8/2005 | Faybishenko et al. |
| 6,950,833 B2 | 9/2005 | Costello et al. |
| 6,985,937 B1 | 1/2006 | Keshav et al. |
| 7,076,717 B2 | 7/2006 | Grossman et al. |
| 7,089,294 B1 | 8/2006 | Baskey et al. |
| 7,127,613 B2 | 10/2006 | Pabla et al. |
| 7,140,020 B2 | 11/2006 | McCarthy et al. |
| 7,155,502 B1 | 12/2006 | Galloway et al. |
| 7,171,415 B2 | 1/2007 | Kan et al. |
| 7,213,065 B2 | 5/2007 | Watt |
| 7,275,249 B1 | 9/2007 | Miller et al. |
| 7,278,008 B1 | 10/2007 | Case et al. |
| 7,284,109 B1 | 10/2007 | Paxie et al. |
| 7,334,108 B1 | 2/2008 | Case et al. |
| 7,340,578 B1 | 3/2008 | Khanzode |
| 7,343,467 B2 | 3/2008 | Brown et al. |
| 7,366,101 B1 | 4/2008 | Varier et al. |
| 7,433,304 B1 | 10/2008 | Galloway et al. |
| 7,451,199 B2 | 11/2008 | Kandefer et al. |
| 7,451,201 B2 | 11/2008 | Alex et al. |
| 7,463,587 B2 | 12/2008 | Rajsic et al. |
| 7,475,419 B1 | 1/2009 | Basu et al. |
| 7,487,254 B2 | 2/2009 | Walsh et al. |
| 7,543,052 B1 | 6/2009 | Cesa Klein |
| 7,551,614 B2 | 6/2009 | Teisberg et al. |
| 7,631,066 B1 | 12/2009 | Schatz et al. |
| 7,739,541 B1 | 6/2010 | Rao et al. |
| 7,752,624 B2 | 7/2010 | Crawford, Jr. et al. |
| 7,756,658 B2 | 7/2010 | Kulkarni et al. |
| 7,769,803 B2 | 8/2010 | Birdwell et al. |
| 7,770,120 B2 | 8/2010 | Baudisch |
| 7,813,822 B1 * | 10/2010 | Hoffberg ................. 700/94 |
| 7,900,206 B1 | 3/2011 | Joshi et al. |
| 8,185,776 B1 | 5/2012 | Gentes et al. |
| 8,321,048 B1 | 11/2012 | Coss et al. |
| 2001/0015733 A1 | 8/2001 | Sklar |
| 2001/0052016 A1 | 12/2001 | Skene et al. |
| 2002/0062451 A1 | 5/2002 | Scheidt et al. |
| 2002/0103886 A1 | 8/2002 | Rawson |
| 2002/0120741 A1 | 8/2002 | Webb et al. |
| 2002/0161869 A1 | 10/2002 | Griffin et al. |
| 2002/0174165 A1 | 11/2002 | Kawaguchi |
| 2003/0014524 A1 | 1/2003 | Tormasov |
| 2003/0041308 A1 | 2/2003 | Ganesan et al. |
| 2003/0101084 A1 | 5/2003 | Otero Perez |
| 2003/0112792 A1 | 6/2003 | Cranor et al. |
| 2003/0126283 A1 | 7/2003 | Prakash et al. |
| 2003/0202709 A1 | 10/2003 | Simard et al. |
| 2003/0204773 A1 | 10/2003 | Petersen et al. |
| 2003/0233446 A1 | 12/2003 | Earl |
| 2004/0003086 A1 | 1/2004 | Parham et al. |
| 2004/0068730 A1 | 4/2004 | Miller et al. |
| 2004/0071147 A1 | 4/2004 | Roadknight et al. |
| 2004/0150664 A1 | 8/2004 | Baudisch |
| 2004/0205101 A1 | 10/2004 | Radhakrishnan |
| 2005/0034070 A1 | 2/2005 | Meir et al. |
| 2005/0050200 A1 | 3/2005 | Mizoguchi |
| 2005/0066358 A1 | 3/2005 | Anderson et al. |
| 2005/0076145 A1 | 4/2005 | Ben-Zvi et al. |
| 2005/0120160 A1 | 6/2005 | Plouffe et al. |
| 2005/0209892 A1 | 9/2005 | Miller |
| 2005/0213560 A1 | 9/2005 | Duvvury |
| 2005/0246711 A1 * | 11/2005 | Berstis et al. ................. 718/105 |
| 2005/0278760 A1 | 12/2005 | Dewar et al. |
| 2006/0015555 A1 | 1/2006 | Douglass et al. |
| 2006/0015637 A1 | 1/2006 | Chung |
| 2006/0047920 A1 | 3/2006 | Moore et al. |
| 2006/0053215 A1 | 3/2006 | Sharma |
| 2006/0126619 A1 | 6/2006 | Teisberg et al. |
| 2006/0126667 A1 | 6/2006 | Smith et al. |
| 2006/0136928 A1 * | 6/2006 | Crawford et al. ............ 718/105 |
| 2006/0136929 A1 | 6/2006 | Miller et al. |
| 2006/0153191 A1 | 7/2006 | Rajsic et al. |
| 2006/0161466 A1 | 7/2006 | Trinon et al. |
| 2007/0028244 A1 * | 2/2007 | Landis et al. ................. 718/108 |
| 2007/0061441 A1 * | 3/2007 | Landis et al. ................. 709/224 |
| 2007/0067435 A1 | 3/2007 | Landis et al. |
| 2009/0043809 A1 | 2/2009 | Fakhouri et al. |

* cited by examiner

SYSTEM AND METHOD PROVIDING A VIRTUAL PRIVATE CLUSTER

PRIORITY CLAIM

The present application is a continuation-in-part of U.S. patent application Ser. No. 14/590,102, filed Jan. 6, 2015, which is a continuation of U.S. patent application Ser. No. 11/276,852, filed Mar. 16, 2006, now U.S. Pat. No. 8,930,536, issued on Jan. 6, 2015, which claims priority to U.S. Provisional Application No. 60/662,240 filed Mar. 16, 2005, the contents of which are incorporated herein by reference in their entirety.

BACKGROUND

1. Technical Field

The present disclosure relates to clusters and more specifically a system and method of creating a virtual private cluster.

2. Introduction

The present disclosure applies to computer clusters and computer grids. A computer cluster can be defined as a parallel computer that is constructed of commodity components and runs commodity software. FIG. 1 illustrates in a general way an example relationship between clusters and grids. A cluster 110 is made up of a plurality of nodes 108A, 108B, 108C , each containing computer processors, memory that is shared by the processors in the node and other peripheral devices such as storage discs connected by a network. A resource manager 106A for the node 110 manages jobs submitted by users to be processed by the cluster. Other resource managers 106B, 106C are also illustrated that can manage other clusters (not shown). An example job would be a weather forecast analysis that is compute intensive that needs to have scheduled a cluster of computers to process the job in time for the evening news report.

A cluster scheduler 104A can receive job submissions and identify using information from the resource managers 106A, 106B, 106C which cluster has available resources. The job would then be submitted to that resource manager for processing. Other cluster schedulers 104B and 104C are shown by way of illustration. A grid scheduler 102 can also receive job submissions and identify based on information from a plurality of cluster schedulers 104A, 104B, 104C which clusters can have available resources and then submit the job accordingly.

Several books provide background information on how to organize and create a cluster or a grid and related technologies. See, e.g., *Grid Resource Management, State of the Art and Future Trends*, Jarek Nabrzyski, Jennifer M. Schopf, and Jan Weglarz, Kluwer Academic Publishers, 2004; and *Beowulf Cluster Computing with Linux*, edited by William Gropp, Ewing Lusk, and Thomas Sterling, Massachusetts Institute of Technology, 2003.

FIG. 2 illustrates a known arrangement 200 comprising a group of computer clusters 214, 216, 218 consisting of a number of computer nodes 202, 204, 206, each having a group of memory disks, swap, local to the computer itself In addition, there can exist a number of services that are a part of that cluster. Block 218 comprises two components, a cluster 202 and a storage manager 212 providing network storage services such as LAN-type services. Block 218 illustrates that the network storage services 212 and the cluster or object 202 are organized into a single and independently administered cluster. An example of this can be a marketing department in a large company that has an information technology ("IT") staff that administers this cluster for that department.

Storage manager 212 can also communicate with nodes or objects 204 in other clusters such as are shown in FIG. 1. Block 216 shows a computer cluster 204 and a network manager 210 that communicate with cluster 204 and can impact other clusters, shown in this case as cluster 202 and cluster 206.

Block 214 illustrates a computer cluster 206 and a software license manager 208. The license manager 208 is responsible for providing software licenses to various user applications and it ensures that an entity stays within bounds of its negotiated licenses with software vendors. The license manager 208 can also communicate with other clusters 204 as shown.

Assuming that computer clusters 214, 216 and 218 are all part of a single company's computer resources, that company would probably have a number of IT teams managing each cluster 216, 214, 218. Typically, there is little crossover or no crossover between the clusters in terms of managing and administration from one cluster to another other than the example storage manager 212, network manager 210 or license manager 208.

There are also many additional services that are local and internal to each cluster.

The following are examples of local services that would be found within each cluster 214, 216, 218: cluster scheduling, message passing, network file system auto mounter, network information services and password services are examples of local services shown as feature 220 in block 214. These illustrate local services that are unique and locally managed. All of those have to be independently managed within each cluster by the respective IT staff Assuming that a company owns and administers each cluster 218, 216 and 214, there are reasons for aggregating and partitioning the compute resources. Each organization in the company desires complete ownership and administration over its compute resources. Take the example of a large auto manufacturing company. Various organizations within the company include sales, engineering, marketing and research and development. The sales organization does market research, looking at sales, historical information, analyzing related data and determining how to target the next sales campaign. Design graphics and rendering of advertising can require computer processing power. The engineering department performs aerodynamics and materials science studies and analyses. Each organization within the company has its own set of goals and computer resource requirements to make certain they can generate its deliverables to the customers.

While this model provides each organization control over their resources, there are downsides to this arrangement. A large cost is the requirement for independent IT teams administering each cluster. There is no opportunity for load balancing where if the sales organization has extra resources not being used, there is no way to connect these clusters to enable access by the engineer teams.

Another cause of reduced efficiency with individual clusters as shown in FIG. 1 is over or under restraining. Users who submit jobs to the cluster for processing desire a certain level of response time according to their desired parameters and permissions. In order to insure the response time, cluster managers typically must significantly over-specify the cluster resources to get the results they want or control over the cycle distribution. When a job is over-specified and then submitted to the cluster, often the job simply does not utilize all the specified resources. This process can leave a percentage of the resources simply unused.

What is needed in the art is a means of maintaining cluster partitions but also sharing resources where needed to improve the efficiency of a cluster or a group of clusters.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Those who manage clusters or submit jobs to clusters want to be able to control the clusters' resources in an efficient manner. There was previously no mechanism to soft partition a cluster or a group of clusters to provide managers with the control they want without giving them a whole lot of additional overhead. Most users do not care how their cluster is set up as long as the resources are available to process submitted jobs and they have the desired level of control.

The present disclosure addresses the deficiencies in the prior art by providing a system and method of establishing a virtual private cluster out of a group of compute resources. In one aspect of the disclosure, the group of compute resources can be viewed as a group of clusters. In order to address the deficiencies in the prior art, the present disclosure introduces steps to create and utilize a virtual private cluster. The method includes aggregating compute resources across the group of compute resources and can be implemented by a computer processor. This step can comprise two levels, a first level of aggregating multiple resources of the same type and a second level of aggregating resources of distinct types. Aggregating multiple resources of the same type would typically indicate pulling together compute hosts that are possibly connected across multiple networks (or clusters) and aggregating those as though they were one giant cluster. The second type of aggregating involves resources of various types. For example, the second type can involve aggregating compute resources together with network resources, application or license management resources and storage management resources.

The method next includes establishing partitions of the group of compute resources to fairly distribute available compute resources amongst a plurality of organizations and presenting only partitioned resources accessible by each organization to users within each organization, wherein the resources presented to each is the virtual private cluster. In this manner, aggregating, partitioning and presenting to a user only his or her soft partitioned resources enables a more efficient use of the combined group of clusters and is also transparent to the user while providing the desired level of control over the virtual private cluster to the user.

Various embodiments of the disclosure include systems, methods and computer-readable media storing instructions for controlling a computing device to perform the steps of generating a virtual private cluster. A tangible computer-readable medium excludes energy, signals per se, and a wireless interface.

Applicants note that the capability for performing the steps set forth herein are contained within the source code filed with the CD in the parent provisional application. For example, a resource scheduler or cluster-workload manager can establish reservations for jobs and virtual private clusters within a compute environment through a resource manager.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only typical embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure.

Figure 1:
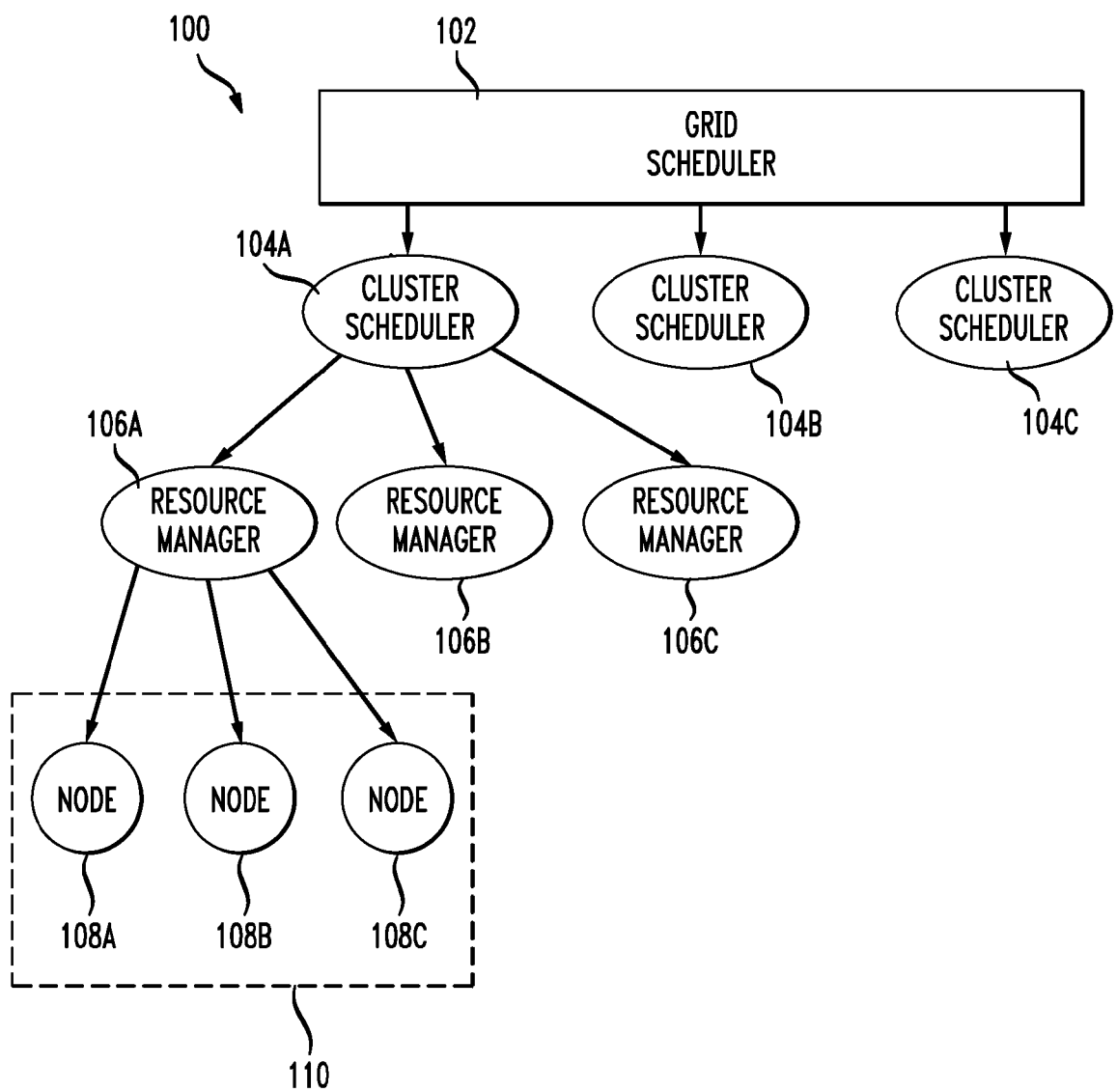
FIG. 1 illustrates the context of the invention by showing a prior art organization of clusters and a grid.
Figure 2:
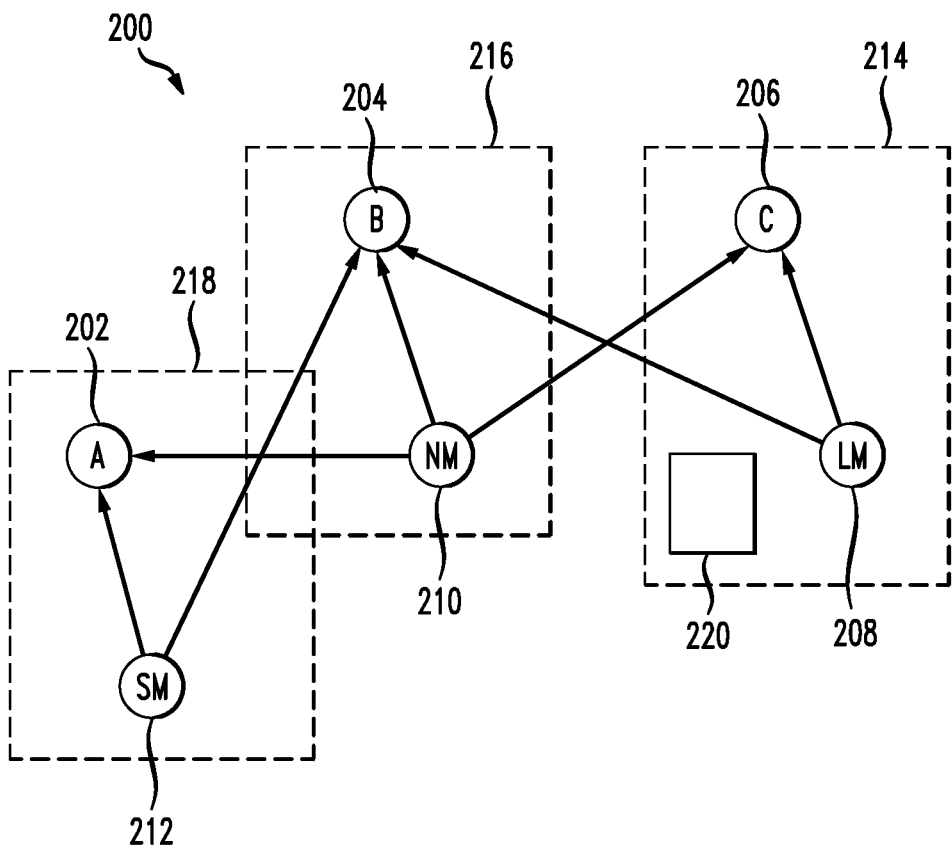
FIG. 2 illustrates a prior art arrangement of clusters within a company or organization.
Figure 3:
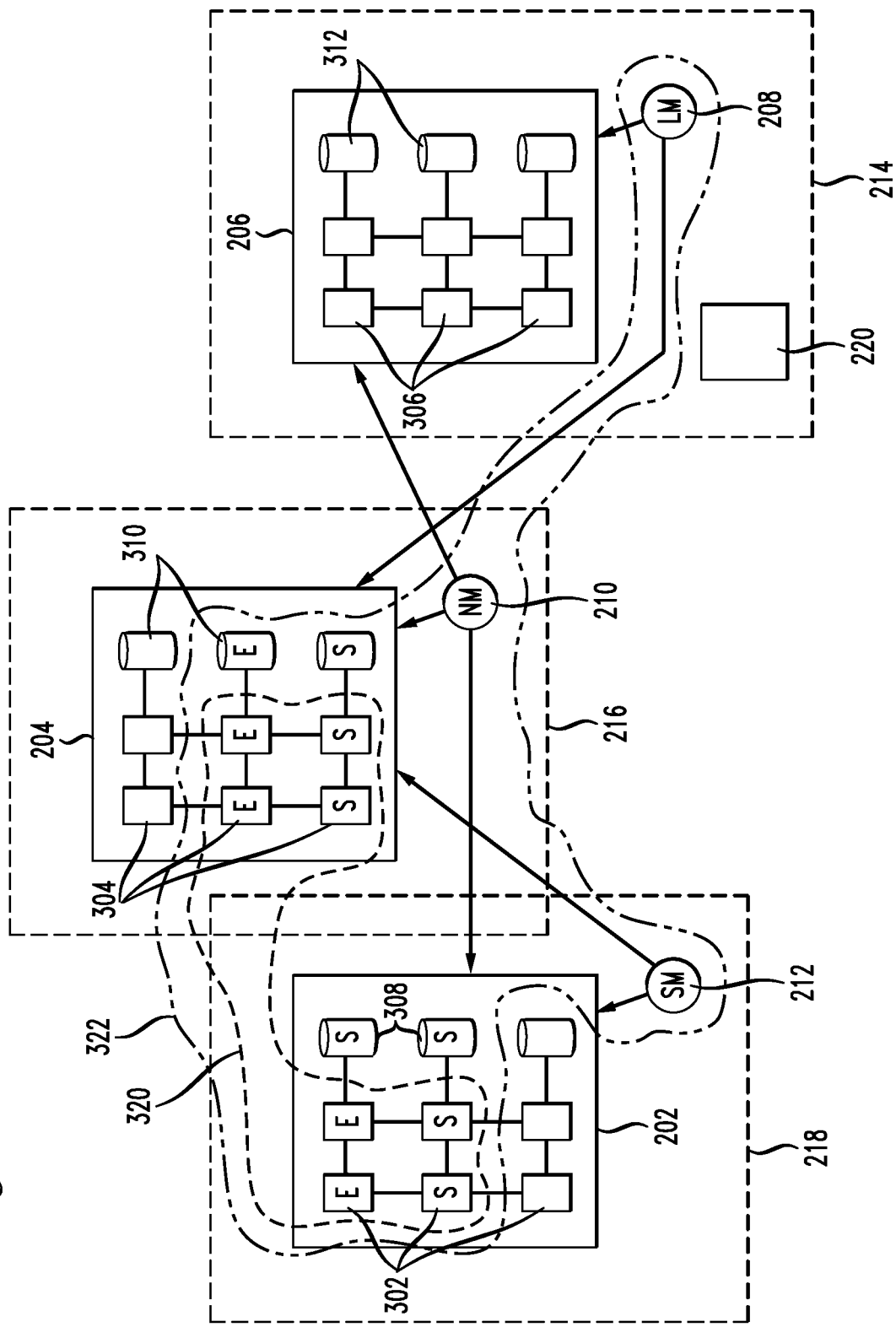
FIG. 3 illustrates an embodiment of the present disclosure.
Figure 4:
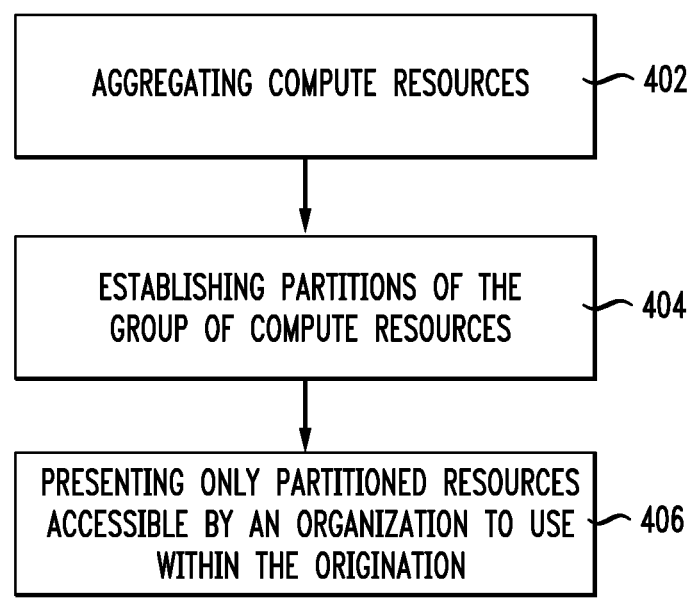
FIG. 4 illustrates a method embodiment of the disclosure.

FIG. 3 illustrates in more detail the example arrangement of three clusters 218, 216 and 214. In this figure, block 218 includes a group of compute nodes 312 and other compute resources 308 organized as a cluster 202. Block 216 includes compute nodes 304 and resources 310 organized as cluster 204. Block 214 includes compute nodes 306 and resources 312 in cluster 206. Resources include CPUs, memory, network bandwidth, harddrive space, and so forth One embodiment of the disclosure is a method of creating a virtual private cluster. The basic method steps are set forth in FIG. 4 and these will be discussed with further reference to FIG. 3. The method comprises first aggregating compute resources 402. This step can comprise two levels, a first level of aggregating multiple resources of the same type and a second level of aggregating resources of distinct types. Aggregating multiple resources of the same type would typically indicate pulling together compute hosts that are possibly connected across multiple networks (or clusters) and aggregating those as though they were one giant cluster. FIG. 3 illustrates this step by aggregating some compute nodes from cluster 202 and some compute nodes from cluster 204. The aggregation is shown as feature 320. The second type of aggregating involves resources of various types. For example, this second type can involve aggregating compute resources together with network resources, application or license management resources and storage management resources. This aggregation of a plurality of types of compute resources is illustrated as feature 322. Other distinct compute resources can also be aggregated in addition to those illustrated.

The method next comprises establishing partitions of the group of compute resources to fairly distribute available compute resources amongst a plurality of organizations 404 and presenting only partitioned resources accessible by each organization to users within each organization 406, wherein the resources presented to each is the virtual private cluster. FIG. 3 shows that the sales organization "S" is partitioned with particular nodes and compute resources and the engineering organization "E" is assigned various nodes and compute resources. These span blocks 218 and 216 and span different clusters. In this manner, aggregating, partitioning and presenting to a user only his or her soft partitioned resources enables a more efficient use of the combined group of compute resources or clusters and is also transparent to the user while providing the desired level of control over the virtual private cluster to the user. Each node has compute resources such as at least a processor and memory.

There are several aspects to aggregation. FIG. 3 illustrates an aggregation of a portion of the compute resources within blocks 214, 216 and 218. Another approach to aggregation involves aggregating all of the compute resources in the clusters 214, 216 and 218. In this case feature 320 would cover all of the compute resources and feature 322 would envelop all the compute resources including the storage manager 212, the network manager 210 and the license manager 208. The preferred approach would depend on the requirements for the resulting virtual private clusters.

Basically, any other type of resource could be controlled under any type of service middleware in a cluster space. The aggregation process generates a giant virtual cluster spanning all resources of all types including processors and memory on each node. The giant virtual cluster is partitioned into a plurality of smaller sub-clusters. One aspect of the partitioning process involves partitioning based on organizational needs. These needs can be dynamic in that they can change over time and can change in terms of space and resources. They can also change according to environmental factors such as current load, quality of service, guarantees and a number of other factors. For example, a dynamic policy can be rigid or dynamic in time, or vary the same way in time, such as on Monday and Wednesday only. The policies can also be dynamic based on a load, backlog or an analysis of future or expected workload. There are many different ways in which policies can be established for creating partitions for virtual private clusters.

An important aspect of presenting the partition to each organization relates to organizing the partition so that users within each individual organization cannot tell that there is any other consumer any other load or any other resources outside of their own virtual partition. A masking occurs, where people, credentials, and jobs can optimally determine what objects outside the partition are masked. The masking hides from a user the people, credentials and jobs associated with other partitions. In other words, they only see inside their partition. In this regard, users only see their own jobs, their own historical information, their own resources, their own credentials, users, groups, classes, etc. This approach gives users a feeling of complete control, that they are in their own virtual environment and the policies that affect the site and the changes of that partition over time do not impact the user in their decisions. With this model, companies can have a single IT team manage a single compute resource for all parties and all that would be needed on a per organization basis is basically a single account manager or champion manager that would make certain that what was needed by each organization within the company was guaranteed within the scope of the virtual cluster partitioning policies.

The process of establishing partitions can further comprise establishing partitions of resources, workloads, policies/services and statistics. These are some of the main factors used in determining the structure of the various partitions for each of the virtual private clusters that are created out of the large aggregated cluster or grid. Other factors are also contemplated which can be the basis for partitioning decisions, such as based at least in part on accessibility credentials. Inside each partition exists a particular quality of service and groups of services are established within each virtual private cluster. Services such as the ability to pre-empt jobs, restart jobs and so forth are services that can be established within each partition.

A graphical user interface for generating virtual private clusters is also provided. The virtual private cluster would be generated by an IT manager or other user with a computer interface. The user would ensure that the policies for the various organizations in the company were configured such that guarantees were made and that the needs of each individual organization were satisfied. Such a graphical interface with a cluster manager gives the user the policies and ability to manage the virtual partitioning.

There is no specific hardware layout necessary to accomplish virtual private clusters. Any desired model will work. For example, if one wanted these compute clusters to actually be distributed geographically, that concept would operate in the same manner across the distributed network. There can be some losses introduced and there can be difficulties associated with the management of the clusters for a single IT term. However, the concepts are the same. Because of these downsides, it is preferable to aggregate the hardware at a single location and have them virtually partitioned so that they look like they are independently available to the scattered end users. The present disclosure works according to either model but the recommended model would be to geographically aggregate to take the benefits of scale.

The preferable programming language for the present disclosure is c code but there is no requirement for any specific language. The cluster manager that performs the operations of aggregation, partitioning and presenting can run on a server with a fallback server enabled and communicate with client modules on the various nodes within each cluster. The cluster manager performs these operations by communicating with various services that can aggregate the information from the cluster and make the information available over the network. Therefore, the cluster manager does not necessarily have to have its own client but it uses cluster peer services. Consequently, it does not matter whether the peer services are aggregated or distributed.

The interfaces allow the cluster manager to communicate natively with the various nodes in the clusters using the appropriate protocols. For example, the cluster manager uses SQL if it is communicating directly to databases. The cluster manager can communicate with any of the propriety resource manager interfaces including load leveler PBS, TORQUE, LSF, SGE and others. In addition, the cluster manager can also communicate basic flat text such as the department of energy SSS, XML-based resource management specification. It can communicate with Ganglia natively. Basically, the cluster manager communicates using every major protocol that is available in resource management and pulls information from those nodes or services to perform the steps of the present disclosure. Those of skill in the art will understand these various protocols and interfaces. Therefore, no further details are provided herein.

An important aspect of dynamic partitioning is that the partitioned virtual private cluster reflected by the system to each individual user is not a static partition. The partition boundaries will be based upon resource lines but they can change over time according to a fixed calendar schedule or they can change according to load based on needs. For example, if a particular organization needs additional resources it can actually vary the partition boundaries by dynamically modifying them according to the load. This modification is within the constraints of various policies. In addition, an administrator can step in and directly adjust either the calendar or the partition boundaries manually. Other factors can be incorporated into the policy to make certain decisions on when, where and how these partition boundaries are adjusted.

When it comes to reflecting the cluster to the end user, the cluster manager partitions not only according to a block of resources but also according to workload. All current and historic workload is analyzed and its use is returned on a per cluster basis. Thus, marketing or sales would only see jobs submitted by their own department and only have historical information on that. Each department would only be able to get start time estimates for jobs within their environment. In addition, this virtual partitioning also constrains the resources and the credentials that are displayed if there are a number of users or groups, or a number of qualities of service that are set up and configured to enable these users to have special services. Only the services or the credentials that are defined within their partition are reflected and shown out to them and so only those are the ones that they can reflect from, configure, check statistics on and so forth.

The definition of a cluster is varied within the industry but commonly it is used to denote a collection of compute resources under a single administrative domain. In most cases they are also within a single user space and single data space although that is not always the case. As used herein, the term cluster is broadly defined as anything that has a single administrative domain, a single group of policies and a single group of prioritizations. With the present disclosure, the creation of a virtual private cluster enables one to set up any number of virtual private clusters within a larger single aggregate cluster where each of them has their own set of distinct prioritizations, policies, rules, etc. That is the definition most sites would use as a grid so any place a user has a multi-administration domain can be defined in this way.

What one achieves is a grid in a box using the principles of the present disclosure in that every group is able to set up their environment the way they want it, run independently and share workload across clusters and inside this space. It differs from a standard definition of a grid which typically involves pulling together geographically distributed resources under no centralized control. This model differs in that a user has a centralized place of control but that centralized place of control is transparent to all the users and the account managers within the system only see their own private grid. They are not aware of the fact that the resources available within their grid are actually being modified and adjusted to meet a larger set of policy needs.

One of the unique aspects of this disclosure is the way in which it aggregates. The cluster manager has the ability to aggregate resources using multiple interfaces so it is actually able to talk to multiple distinct services. Some of the key issues that it must handle in aggregating these resources is not only speaking to multiple APIs (application programming interfaces) or the various interfaces of any type. The cluster manager has to be able to speak all those interfaces, retrieve data related to each of those interfaces and correlate the data. That is another distinct issue is correlating conflicts in data, filling in holes of missing data. In addition to aggregating the data from those multiple sources and correlating the data and determining a resulting state, the present disclosure also uses the same interface to distribute its functionality across multiple services, and it is able to do that allowing a site or an administrator to actually assign various services and various pieces of control. The cluster manager can assign an allocation manager responsibility of reconfiguring a node while it talks to a queue manager for launching jobs in parallel across the system. Therefore, the ability of differentiating the required services that are needed to manage such a cluster amongst multiple services is valuable.

In one example, filling in holes of missing data can be done through the use of templates. Templates can provide an efficient and generalized approach for configuration data for respective virtual private clusters. A multi-tenant compute environment will have many different applications that are going to be run in the environment for different organizations. There will be many different configurations for the different applications. Examples of specific configuration data include, without limitation, one or more of a virtual machine image, memory, network configuration, security requirements, CPU requirements, high availability infrastructure, database as a service environment, infrastructure as a service environment, operating systems, software licenses, software applications and so forth. An environment can be tied directly to an 'application', other environments can be tied to a 'service' or 'collection of services', or will simply be used as a resource for test development or other services. This disclosure is not limited to environments with a one-to-one launch of a specific application but involves handling many use cases of virtual private clusters.

Thus, rather than having an individual configuration for each requirement or application for a subscriber of the virtual private cluster, the compute environment provider can have templates which can be chosen to determine efficiently a configuration and provisioning required resources for the subscriber. The templates can be provided by the service provider, by the requestor middleware, or by a cloud broker. The origin of the template can be from any location or entity. The reason there will be holes in the information can be that a subscriber or workload does not provide customized data and/or that the compute resource provider does not receive such custom information. Each time an application or workload is to expand into or use a virtual private cluster, the configuration does not have to be customized for each application, but can be standardized through the use of a template. The "missing data" would in this case be the data that is not needed for individual application or workload customization because the template will fill in those holes of data. If, for example, there are two partitions to be created and two virtual private clusters presented from the compute environment, the system can retrieve a first template and a second template and use those templates as the basis, at least in part, for creating the respective virtual private clusters for the different users.

In experiments, the inventor set up a Portable Batch System (PBS), a standard resource manager which pulls in information about the state of the nodes and allows a user to also submit jobs, query the jobs, launch the jobs and manage the jobs. A shortcoming of that approach is the fact that it does not provide very accurate or very complete pieces of resource information. In the experiment, the particular lab setup was used to introduce the Ganglia service (which is a node monitor that allows an IT manager to see a lot more information about the node). A multiple resource manager configuration was set up to pull in basically everything PBS knows about the jobs and about the compute nodes. The information available from Ganglia was then overlayed giving a more complete view including network load information, network traffic, IO, traffic swap activity and the like. This information is important for making good scheduling decisions that are not available through a standard resource manager. In addition to that, the system enables one to connect the cluster manager to Red Carpet or some other provisioning system. Those of skill in the art will understand the operation of the Red Carpet software in this space. This allows one to analyze workload that is coming in through PBS and view all the load metrics that are coming in from Ganglia. If it is determined that the load is such that the cluster is not properly configured to optimally meet customer needs, the IT manager or the system automatically can communicate with Red Carpet to change the configuration of this or that node such that it has the operating system or the applications that are needed by these jobs that are coming in through PBS. Then as the node(s) reboots, the information that is available from PBS is no longer valid because the node is off line. The PBS services are dead but the cluster manager has alternate sources of information about the node state. The cluster manager can use that information, continue to proceed with the understanding that the node is in fact being re-provisioned and rebuilt. Everything works properly and stays on track and the cluster manager can schedule the workload onto this newly installed node as soon as it becomes available.

There are several benefits to virtual clustering. One benefit is the aggregation which results in reduced cost in hardware, staffing, and fewer points of failure. Another benefit lies with the ability to specify the true partitioning boundaries along the lines of what users really care about without over specifying which is required by other systems where one again fragments the resources. With the dynamic partition one is able to load balance across the clusters while still providing a view as if they were independent and distinct to end users.

While load balancing is commonly used, the present disclosure is distinct in that it provides load balancing with absolute guarantees (providing the resources do not fail). It guarantees resource availability to various organizations allowing them to have high levels of confidence that they can meet their deadlines and their objectives.

Embodiments within the scope of the present disclosure can also include non-transitory computer-readable storage media for carrying or having computer-executable instructions or data structures stored thereon. Such non-transitory computer-readable storage media can be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure can be practiced in network computing environments with many types of computer system configurations, including personal computers, hand-held devices, multi-processor systems, microprocessor-based or programmable consumer electronics, network PCs, minicomputers, mainframe computers, and the like. Embodiments can also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

Although the above description can contain specific details, they should not be construed as limiting the claims in any way. Other configurations of the described embodiments of the invention are part of the scope of this invention. Accordingly, the appended claims and their legal equivalents should only define the invention, rather than any specific examples given.

I claim:

1. A method of managing a compute environment, the method comprising:
aggregating disparate types of resources in the compute environment comprising multiple physically separate compute devices by:
communicating with a first interface of a first resource and with a second interface of a second resource, when the first interface and the second interface are of different types;
retrieving and correlating data from the first interface and the second interface to yield correlated data;
retrieving first template data and second template data for establishing partitions; and
determining, based at least in part on the correlated data, a resulting state for the first resource and the second resource, wherein the disparate types of resources comprise at least two of compute resources, network resources, application management resources, license management resources, and storage management resources, to yield aggregated resources;
establishing, based at least in part on the first template data, a first partition and, based at least in part on the second template data, a second partition within the aggregated resources; and
presenting a first virtual private cluster associated with the first partition which delivers resources according to a first policy of a first organization; and
presenting a second virtual private cluster associated with the second partition which delivers resources according to a second policy of a second organization.

2. The method of claim 1, further comprising masking information not directly associated with one of the first virtual private cluster and the second virtual private cluster.

3. The method of claim 2, wherein masking information comprises using workload, credentials, statistics, and resources associated with one of the first virtual private cluster and the second virtual private cluster to determine what information is masked.

4. The method of claim 3, wherein the information that is masked comprises people, credentials and jobs associated with other partitions.

5. The method of claim 1, wherein establishing the first partition and the second partition within the aggregated resources enables compute resources to be fairly distributed amongst different organizations.

6. The method of claim 1, wherein the compute resources comprise a group of independently administered clusters.

7. The method of claim 1, wherein the first virtual private cluster is presented transparently to users such that users in the first organization view the first virtual private cluster with a desired level of control.

8. The method of claim 7, wherein the desired level of control has at least three tiers comprising a system administrator, a virtual cluster administrator and an end user.

9. The method of claim 8, wherein the system administrator makes the first virtual private cluster, the virtual cluster administrator makes policies in the first virtual private cluster, and the users of the first organization are subject to the policies.

10. The method of claim 1, wherein establishing the first partition and the second partition occurs based on organizational required criteria and a preferred criteria by which the partitioned resources are bounded.

11. The method of claim 10, wherein establishing the first partition and the second partition further is guaranteed to satisfy the organizational required criteria and seeks to maximize satisfaction of the preferred criteria.

12. The method of claim 11, wherein as organization needs are dynamic, the step of establishing partitions is dynamically executed to modify the partitioned resources within one of the first virtual private cluster and the second virtual private cluster to match changing organization criteria.

13. The method of claim 11, wherein the organization needs are dynamic in terms of time.

14. The method of claim 11, wherein the organization needs are dynamic in terms of one of the organizational required criteria, the preferred criteria and environmental factors.

15. The method of claim 14, wherein the environmental factors comprise one or more from the following list: current load, quality of service, and guarantees related to time.

16. The method of claim 1, wherein the users of the first virtual private cluster only see a user's own workload, a user's own historical information, a user's own resources, a user's own credentials, users, groups and classes.

17. The method of claim 1, wherein establishing the first partition and the second partition further comprises establishing partitions of one of resources, workloads, policies/services and statistics.

18. The method of claim 1, wherein establishing the first partition and the second partition of the resources further comprises partitioning the resources based at least in part on accessibility credentials.

19. A system comprising:
a processor; and
a computer-readable medium storing instructions which, when executed by the processor, cause the processor to perform operations comprising:
aggregating disparate types of resources in a compute environment comprising multiple physically separate compute devices by:
communicating with a first interface of a first resource and with a second interface of a second resource, when the first interface and the second interface are of different types;
retrieving and correlating data from the first interface and the second interface to yield correlated data;
retrieving first template data and second template data for establishing partitions; and
determining, based at least in part on the correlated data, a resulting state for the first resource and the second resource, wherein the disparate types of resources comprise at least two of compute resources, network resources, application management resources, license management resources, and storage management resources, to yield aggregated resources;
establishing, based at least in part on the first template data, a first partition and, based at least in part on the second template data, a second partition within the aggregated resources; and
presenting a first virtual private cluster associated with the first partition which delivers resources according to a first policy of a first organization; and
presenting a second virtual private cluster associated with the second partition which delivers resources according to a second policy of a second organization.

20. A virtual private cluster, the virtual private cluster generated by operations comprising:
aggregating disparate types of resources in a compute environment comprising multiple physically separate compute devices by:
communicating with a first interface of a first resource and with a second interface of a second resource, when the first interface and the second interface are of different types;
retrieving and correlating data from the first interface and the second interface to yield correlated data;
retrieving first template data and second template data for establishing partitions; and
determining, based at least in part on the correlated data, a resulting state for the first resource and the second resource, wherein the disparate types of resources comprise at least two of compute resources, network resources, application management resources, license management resources, and storage management resources, to yield aggregated resources;
establishing, based at least in part on the first template data, a first partition and, based at least in part on the second template data, a second partition within the aggregated resources; and
presenting a first virtual private cluster associated with the first partition which delivers resources according to a first policy of a first organization; and
presenting a second virtual private cluster associated with the second partition which delivers resources according to a second policy of a second organization.

* * * * *